July 12, 1932.  E. T. BYSSHE ET AL  1,866,542
CHASER
Filed June 21, 1930
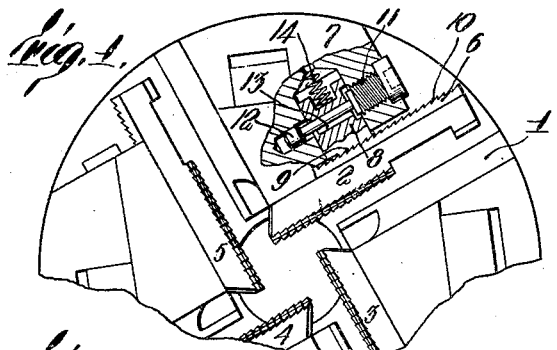
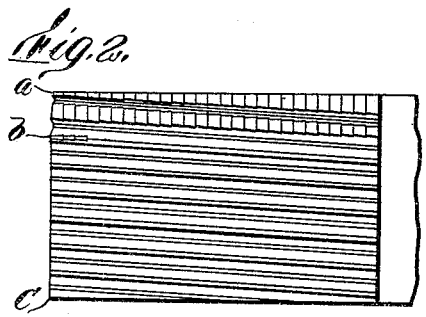
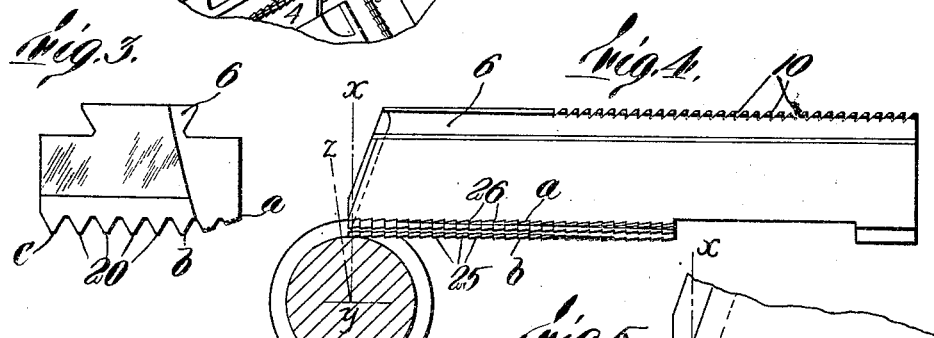
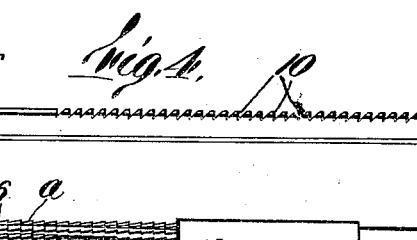
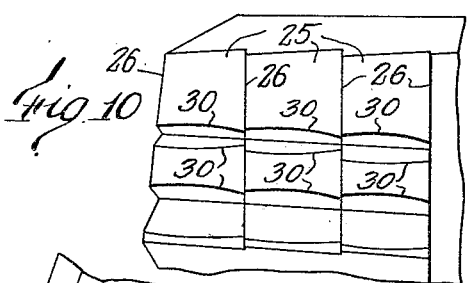
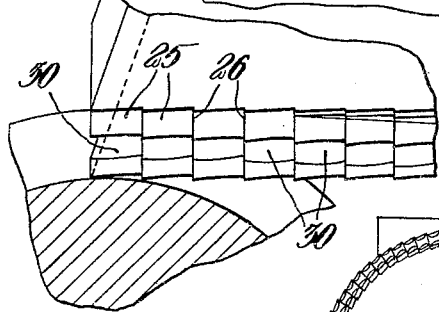
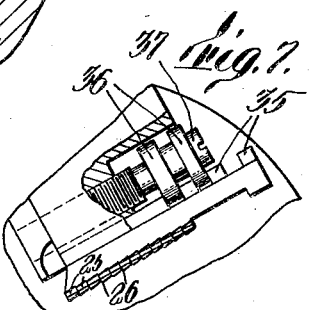
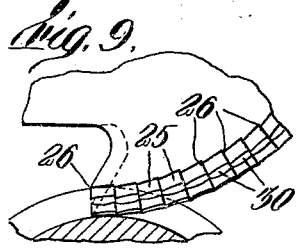
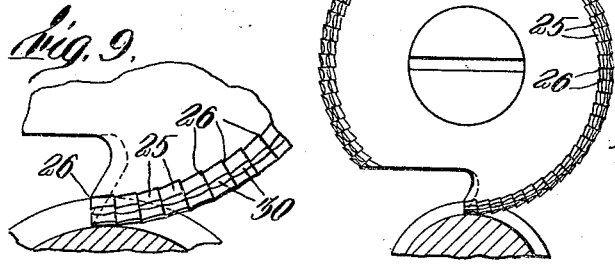
Inventors
Ernest T. Bysshe
Robert R. Tenn
by Wright Brown Quinby & May
Attys.

Patented July 12, 1932

1,866,542

UNITED STATES PATENT OFFICE

ERNEST T. BYSSHE AND ROBERT R. FINN, OF SPRINGFIELD, VERMONT, ASSIGNORS TO JONES & LAMSON MACHINE COMPANY, OF SPRINGFIELD, VERMONT, A CORPORATION OF VERMONT

CHASER

Application filed June 21, 1930. Serial No. 462,753.

This invention relates to chasers for cutting screw threads and more particularly to chasers of the so-called tangent type, which are provided with ridges along one face, the ends of these ridges at the cutting portion of the chaser forming the cutting edges. As is customary with chasers, the first few teeth of the chaser are chamfered off to progressively less extent from the entering end of the chaser so that each of these teeth removes a portion of stock, these being successively deeper until the entire cross section of the valley between adjacent threads has been removed. In order to cut threads with smooth flanks it is usually found desirable that the chaser points be not too free cutting on their flank-forming sides. We have discovered, however, that this does not apply to the chamfered ends of the teeth which do not cut faces appearing in the finished threads and that it is desirable that these chamfered faces shall be provided with clearance.

In accordance with this invention, therefore, these chamfered faces are cut back in successive steps for clearance purposes and in order that each chaser may properly cooperate with others of a set to take its proper proportion of the cut, means are preferably provided for supporting the chasers in lengthwise positions, differing successively by increments equal to the clearance steps so that when a chaser is ground for sharpening, it is ground back until the forward end of the next preceding step is in proper cutting position when the chaser is moved forward by one holding increment. By the use of such clearance the chaser cutting edge may be advanced slightly beyond the normal point of tangency and yet have clearance for the cut, which is found in practice to produce better threads. In connection with the clearance for the chamfered faces, the flanks of the ribs may be concaved to conform to the thread contour as described in our application for patent Serial No. 363,303, filed May 5, 1929, for chasers and methods of manufacture. When this is done the concavities should be coextensive with the clearance increments and positioned to cooperate for correct positioning by the chaser securing means in the manner set forth in that application for patent and in correct relation to the clearance increments. These concavities are so formed that the flanks of the chaser conform closely to the curved contours of the thread, preventing the cutting edges of these flanks from too free cutting, and by their engagement with the thread flanks they aid in guiding the chaser onto the work.

For a more complete understanding of this invention, reference may be had to the accompanying drawing in which Figure 1 is a fragmentary view partly in front elevation and partly in section of a die employing tangent type chasers relieved according to this invention.

Figure 2 is a front plan to a larger scale of one of the chasers.

Figure 3 is an end elevation of the same.

Figure 4 is a side elevation of the same, a piece of work being threaded being shown in section.

Figure 5 is a fragmentary view to a larger scale of a portion of Figure 4.

Figure 6 is a view similar to Figure 5, but showing the chaser rib flanks concaved to correspond with the chamfered clearances.

Figure 7 is a detail elevation partly in section showing a modified construction of the chaser holder for a die.

Figure 8 is an elevation showing a circular chaser having the concavities and reliefs similar to the showing of Figure 6.

Figure 9 is a portion similar to Figure 8, but to a larger scale.

Figure 10 is a fragmentary plan looking directly against the chamfered faces of the chaser of the form shown in Figure 6.

Referring first to Figures 1 to 5, at 1 is shown the end of a die having tangent chasers such as 2, 3, 4 and 5 carried thereby. Each of these chasers may be mounted as shown for chaser 2 with a dovetail portion 6 on its rear face slidably fitting a groove in the chaser holder 7 and normally held against axial movement therein by means of a spring pressed plug 8 having a serrated lower face 9 engaging serrations 10 in the chaser dovetail. These mating serrations define definite spacing increments for the lengthwise positioning of the chaser element. At 11 is shown a threaded plug which may be manipulated to cause the plug 8 to release the chaser as by means of a head 12 which may be drawn into a perforation 13 in the plug wedging the plug inwardly against the action of its spring 14. This is as illustrated in our application for patent Serial No. 431,498, filed February 25, 1930. The working face of the chaser is provided with longitudinally extending ribs 20, the ends of certain of which adjacent the work entering side, as between the points $a$ and $b$ (Figure 3) of the chaser form cutting teeth, the remaining ribs as from $b$ to $c$ forming merely guiding or leading members engaging the threads already cut and serving to feed the chaser further onto the work as usual. The teeth from $a$ to $b$ are chamfered off to progressively less extent away from the edge $a$ toward $b$ so that each tooth of these ribs removes a portion of the material which is removed by successive chasers to a gradually increasing depth until the point $b$ is reached at which time the thread valleys have been cut to their full depth, these ribs, of course, being in cross section similar to the contour of the thread valleys which are to be cut in the work.

In accordance with this invention these chamfered faces are cut back from the general plane of chamfer by a series of steps, shown enlarged in Figure 5, to form serrations having inwardly or upwardly inclined working faces 25 spaced by substantially perpendicular walls 26. Each one of these faces 25 is thus tapered back to its adjacent back wall 26 in a rearward direction thus forming a relieved cutting face providing clearance back from the cutting edge of the work at the portion 26. The length of each of these cut back portions should be the same as the spacing of the serrations 10 in order that when a chaser is ground it may be ground back to one of the points 26, whereupon it will be brought exactly into the same position relative to the work as when it is ground back to any other point 26, the increments between adjacent portions 26 being equal to the increments between the serrations 10. Thus by grinding off at each sharpening operation to an edge 26 the chaser may be returned to the die with its cutting edge in exactly the same relation as when it is cut back to any other edge 26, so that it will remove its proportion of the stock in the thread valleys.

It is found in practice that the edges which cut the thread flanks should not be free cutting and consequently it is usual practice to set the forward edge of a tangent chaser forwardly of the point of tangency. When the chaser is given top rake this amount of forward setting must be increased in order that the first teeth to cut, which are back from this forward edge, may not be too free cutting. This condition is shown in Figures 4 and 5, the dot and dash lines $x$—$y$ representing the tangent axis. When the chamfered faces are cut back or relieved, however, the chamfer being progressively deeper back from the forward cutting edges of the chaser ribs in each cut back portion, their forward cutting edges are back of the line of tangency $x$—$y$ between the cut back faces and the work, even though the chaser as a whole is forward of its tangent position. Thus the edges of the chamfered portion are made free cutting without causing the edges which cut the thread flanks to be free cutting.

Not only may this relieving be done on the chamfered faces, but in conjunction therewith the advantages of the tangent engagement of the chaser teeth on the flank faces of the threads specified in our application for patent hereinbefore mentioned may also be availed of. It is found, however, in practice that too free cutting of the chaser teeth on the flank faces of the work is not desirable, hence it is usually preferable to form these concavities in the flank faces of the chaser teeth to substantially conform with the curvature of the flank faces of the completed work. This may be done to the side faces of the chaser ribs either over only those ribs which have cutting edges or over all the ribs including the cutting and also the guiding ribs, as has been pointed out in our application for patent hereinbefore referred to, but in either case the ends of the concavities should be in line with the portions 26 of the clearance faces 25. Thus whenever the chaser is ground back to bring a new clearance face into proper position the concavities on the rib flanks are also in proper position to correctly bear on the work. The concavities are shown at 30 in Figure 6, which also shows the clearance steps of faces 25.

Either of these constructions may be employed in connection with circular chasers of the tangent type, as shown, for example, in Figure 8 in which the outer faces along the chamfered ribs, the ends of which form the cutting teeth, are provided with both the clearance cut back portions on the chamfered faces 25 and the tangent concavities 30 on their flank faces. This is shown to a larger scale in Figure 9, the chaser at each grinding being ground back to alinement with one of the edges 26, whereupon both the concavities and the relieved areas may be brought into proper position relative to the work by proper angular adjustment of the chasers by successive definite increments.

In Figure 7 is shown a modified construction for retaining the chasers of the straight tangent type in the chaser holder of the die in accordance with which a micrometer adjustment rather than increment adjustment of the chaser may be effected. In this form the chaser is unprovided with serrations on its back face for engagement with fixed reference points on the chaser holder but instead is provided with transverse ribs as 35 for engagement for cooperation with circular ribs 36 on an adjusting screw 37 carried by the chaser holder. The cutting points of the chaser are shown as provided with the reliefs 25 on the chamfered faces and they may, if desired, be provided with mating concavities on their flank faces.

Where the concavities are employed and they are formed in the cutting ribs only, these ribs are preferably initially formed to project further from the back face of the chaser than the remaining ribs so that when the concavities are formed the remaining ribs will bear in tangent relation between the threads already cut. When the concavities are arranged in all the teeth, these teeth will be made initially in the same plane, all as has been fully described in our application for patent Serial No. 363,303 hereinbefore mentioned.

Certain embodiments of this invention having thus been described, it should be evident to those skilled in the art that various changes and modifications might be made therein without departing from the spirit or scope of this invention as defined by the appended claims.

We claim:

1. A chaser having a tangent series of ribs formed in cross section to conform to the valley contours between adjacent threads to be cut, the tips of said ribs at one side of the chaser being chamfered, the chamfered faces being cut back from the general plane of chamfer for clearance at intervals lengthwise of said ribs.

2. A chaser having a tangent series of ribs formed in cross section to conform to the valley contours between adjacent threads to be cut, the tips of said ribs at one side of the chasers being chamfered, the chamfered faces being cut back from the general plane of chamfer for clearance at intervals spaced by definite increments lengthwise of said ribs, said chaser having gaging elements spaced by said increments.

3. A chaser having a tangent series of ribs formed in cross section to conform to the valley contours between adjacent threads to be cut, the tips of said ribs at one side of the chaser being chamfered, the chamfered faces being cut back from the general plane of chamfer for clearance at intervals spaced by definite increments lengthwise of said ribs, said chaser having gaging elements spaced by said increments, the side faces of certain of said ribs having concavities substantially fitting the flanks of the threads to be cut and arranged with their ends mating the cut back intervals of said chamfer.

4. A chaser having a tangent series of ribs formed in cross section to conform to the valley contours between adjacent threads to be cut, the tips of said ribs at one side of the chaser being chamfered, the chamfered faces being cut back for clearance at intervals spaced by definite increments lengthwise of said ribs, the side faces of certain of said ribs having concavities substantially fitting the flanks of the threads to be cut and arranged with their ends mating the cut back intervals of said chamfered faces, said chaser having gaging elements spaced by the same increments.

5. A chaser having a series of ribs formed in cross section to conform to the valley contours between adjacent threads to be cut, the tips of said ribs at one side of the chasers being chamfered, the chamfered faces being cut back from the general plane of chamfer for clearance at intervals spaced by definite increments lengthwise of said ribs, the side faces of said chamfered ribs only having concavities substantially fitting the flanks of the threads to be cut and arranged with their ends mating the cut back intervals of said chamfer.

6. A chaser having a series of ribs formed in cross section to conform to the valley contours between adjacent threads to be cut, the tips of said ribs at one side of the chasers being chamfered, the chamfered faces being cut back from the general plane of chamfer for clearance at intervals spaced by definite increments lengthwise of said ribs, the side faces of said chamfered ribs only having concavities substantially fitting the flanks of the threads to be cut and arranged with their ends mating the cut back intervals of said chamfer, said chaser having gaging elements spaced by the same increments.

7. A chaser having a series of ribs formed in cross section to conform to the valley contours between adjacent threads to be cut, the tips of said ribs at one side of the chaser being chamfered, said chamfered faces being cut back progressively deeper from the forward ends of said ribs whereby when said chaser is applied to work with the cutting edges of the side faces of said ribs at least as far forward as the points of tangency of said side faces with the work, the cutting edges of the chamfered faces are back of tangency between said faces and the work.

In testimony whereof we have affixed our signatures.

ERNEST T. BYSSHE.
ROBERT R. FINN.